Figure 1:
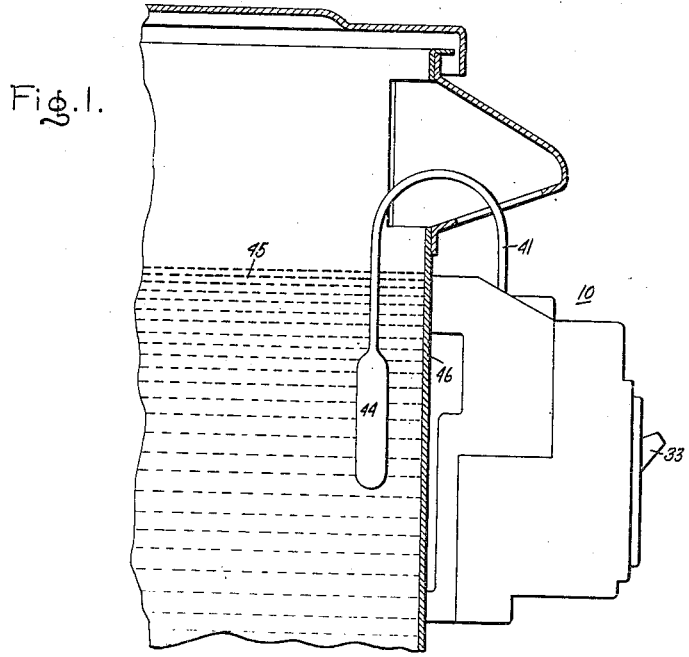

Sept. 8, 1936.  C. H. HILL  2,053,952
PROTECTIVE DEVICE
Filed Nov. 29, 1935    2 Sheets-Sheet 1

Inventor:
Charles H. Hill,
by Harry E. Dunham
His Attorney.

Sept. 8, 1936.  C. H. HILL  2,053,952
PROTECTIVE DEVICE
Filed Nov. 29, 1935  2 Sheets-Sheet 2

Inventor:
Charles H. Hill,
by Harry E. Dunham
His Attorney.

Patented Sept. 8, 1936

2,053,952

UNITED STATES PATENT OFFICE 2,053,952

PROTECTIVE DEVICE

Charles H. Hill, Drexel Hill, Pa., assignor to General Electric Company, a corporation of New York Application November 29, 1935, Serial No. 52,018

17 Claims. (Cl. 200—31)

My invention relates to protective devices, more particularly to protective devices for electrical apparatus such as transformers, and has for an object the provision of a simple, reliable and inexpensive device of this type.

In a co-pending application of William H. Cooney, Serial No. 47,191, filed October 28, 1935, entitled "Protective devices", which application is assigned to the same assignee as the present invention, there is described and broadly claimed a protective device for electric transformers which comprises a thermal element responsive to the transformer current, a second thermal element responsive to the temperature of the transformer cooling oil, and means responsive to the combined movement of the two thermal elements for disconnecting the load from the transformer when the temperature of the transformer windings reaches a dangerously high value.

Although the device, particularly described and claimed in the above-identified application as the invention of the said William H. Cooney, is quite satisfactory in its operation, something is yet to be desired in flexibility of calibration. Furthermore, the said device is not readily adaptable to multi-pole arrangements. Accordingly, it is a further object of my invention to provide a multi-pole protective device for a transformer which is extremely flexible in its application and which is effective to control the transformer connections in accordance with the current flowing in the transformer windings, or in accordance with the temperature of the transformer oil, or in accordance with both.

In carrying out my invention in one form, I provide a lever mounted for pivotal movement about either of its ends, together with means for pivotally moving the lever about one of its ends in accordance with the value of the current flowing in the transformer windings, and means for pivotally moving the lever about its other end in accordance with the temperature of the transformer. Means are also provided for controlling the connections of the transformer in response to a predetermined movement of a portion of the lever intermediate its ends, which movement is the resultant of the individual movements of the lever ends. More specifically, I provide a multi-pole circuit breaker which is provided with bi-metallic elements associated with each pole responsive to the current flow therethrough and with an expansible bellows responsive to the temperature of the transformer oil. The circuit breaker includes a trip device comprising a rotatable shaft provided with an extending arm which pivotally supports one end of a movable lever, the other end of which is abuttingly supported by a movable member. Means are provided for rotating the shaft in accordance with the movement of any one of the bi-metallic elements to pivotally move the lever about its abuttingly supported end, and connecting means are provided for moving the abutting support to pivot the lever about its pivotally supported end in accordance with the expansion of the bellows. Tripping means for operating the circuit breaker to its open-circuit position are arranged to respond to a predetermined resultant movement of the lever, and means are provided for disconnecting the connecting means between the expansible member and the abutting support to permit immediate resetting of the tripping means while the expansible member is in its expanded condition.

Figure 2:
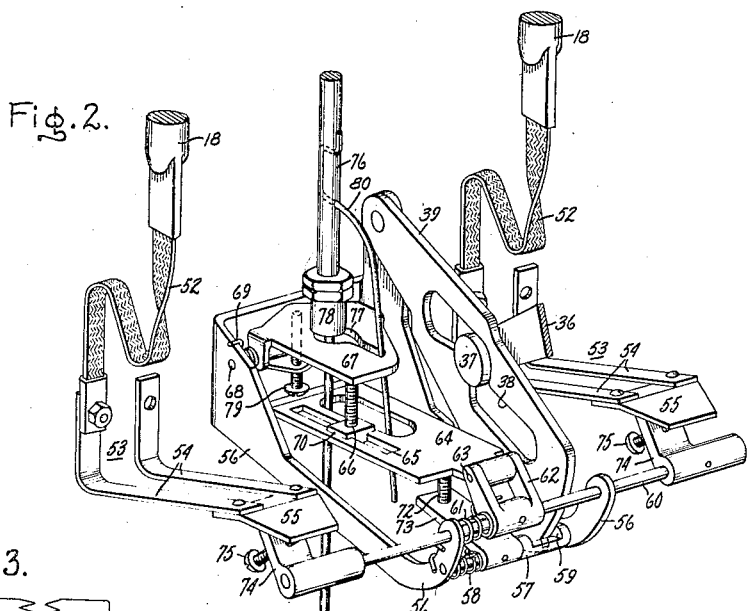
Figure 3:
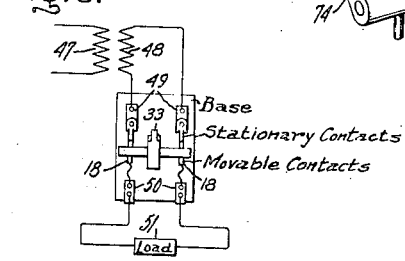
Figure 4:
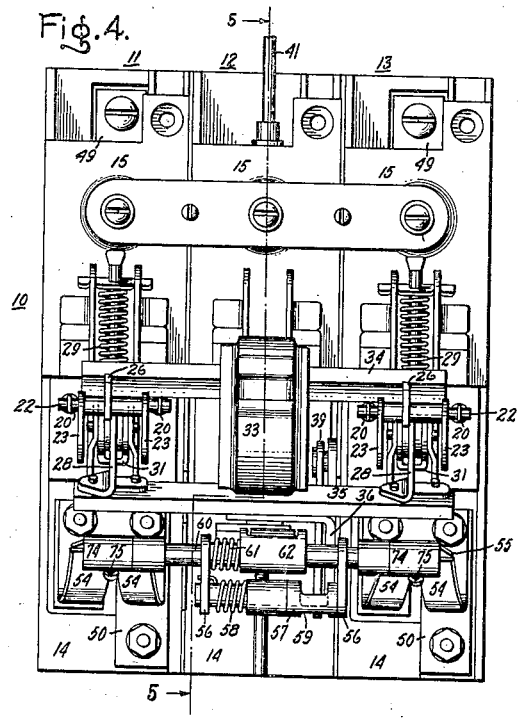
Figure 5:
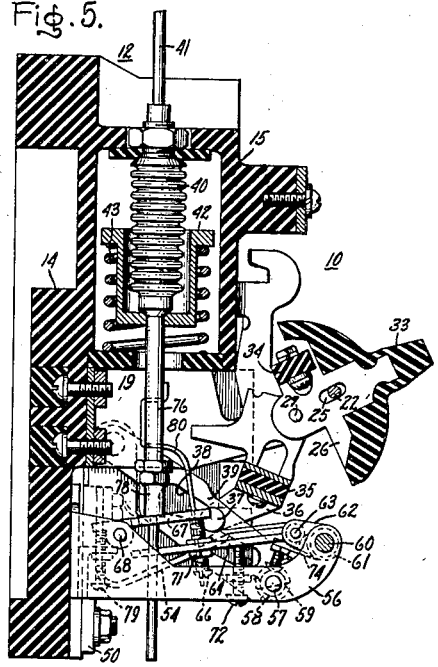
Figure 6:
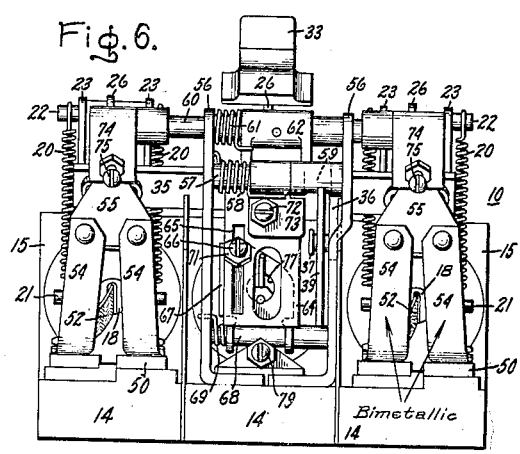
Figure 7:
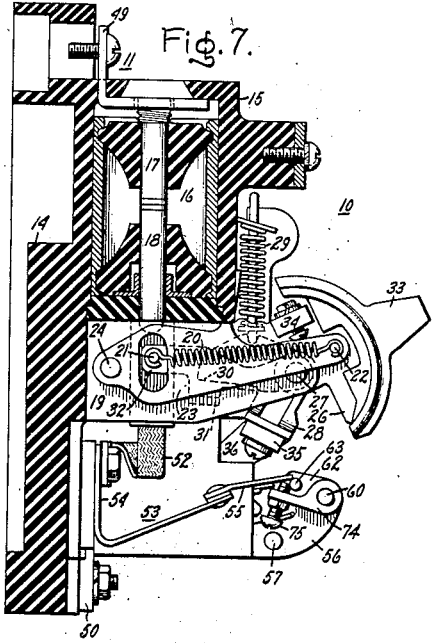

For a more complete understanding of my invention reference should now be had to the drawings in which Fig. 1 is an elevational view of a protective device embodying my invention applied to a distribution transformer of the oil-cooled type, Fig. 2 is a skeleton perspective view of the tripping mechanism for the device shown in Fig. 1; Fig. 3 is a circuit diagram illustrating diagrammatically the circuit connections of the transformer and the protective device shown in Fig. 1; Fig. 4 is a front view of the protective device with the cover removed more clearly to show the constructional details; Fig. 5 is a sectional view taken along the line 5—5 of Fig. 4, and Figs. 6 and 7 are respectively end and side views of the device shown in Fig. 4, Fig. 7 being partly in section more clearly to illustrate the constructional details.

Referring now to the drawings, I have shown my invention in one form as applied to a multi-pole circuit breaker 10 of the type described and claimed in a copending application of Winfield A. Atwood, Serial No. 29,479, filed July 2, 1935, entitled "Circuit breakers" which application is assigned to the same assignee as the present invention. As described in the said Atwood application, the circuit breaker 10 (see Fig. 4) comprises a plurality of individual single pole units 11, 12 and 13, the bases of which are rigidly secured together in side by side relation. As best shown in Figs. 4 and 7 the single pole unit 11 comprises a base member 14 preferably formed of insulating material and provided with a housing 15 within which is located a circuit interrupter 16 of the compression chamber type having a fixed contact 17 and reciprocally movable contact 18.

Secured to the base 14 adjacent the housing 15 is a U-shaped frame 19 which supports the operating mechanism. For the purpose of the present invention this operating mechanism may be described as comprising a pair of over-center springs 20, the respective adjacent ends of which are connected to the opposite ends of a pin 21 which extends through a slot (not shown) in the end of the movable contact 18, the other ends of the springs 20 being connected to a pin 22 which is supported on the free ends of a pair of levers 23, the opposite ends of which are pivotally mounted on a fixed pin 24. The pin 22 extends through a slot 25 (Fig. 5) in an operating member 26 which is pivotally mounted on a pin 27 supported by the frame 19. Also pivoted on the pin 27 is a tripping member 28 which is normally held in the position shown against the bias of a tripping spring 29 in a manner to be more fully described later. This tripping member 28 is provided with an extending finger 30 arranged to engage an extending portion 31 formed on a guide-link 32, one end of which is pivotally supported on the pin 27 and the other end of which pivotally engages the pin 21.

Although I have shown three single pole units 11, 12 and 13, only the two outer units 11 and 13 constitute poles of the circuit breaker, the unit 13 being identical in construction to the above-described unit 11. As shown best in Fig. 5 the center unit 12 is simply a skeleton unit, the compression chamber and all of the operating mechanism except the operating member 26 and the tripping member 28 being eliminated. As shown, the operating member 26 of the unit 12 is provided with an insulated handle 33 and is secured to an insulated cross-bar 34 which extends across the three single pole units and is likewise secured to the operating members 26 of the units 11 and 13.

It will be apparent that when the handle 33 is moved to rotate the operating member 26 of the center unit 12 about its pivot the cross-bar 34 will be moved to rotate the operating members 26 of the two outer units 11 and 13, so as to carry the springs 20 over center relative to the pivot pins 27. Thus, the movable contacts 18 of the units 11 and 13 will be operated between the open and closed circuit positions with a snap action as more fully described in the above referred to Atwood application.

A second insulated cross-bar 35 likewise extends across the three single pole units and is connected to the tripping members 28. Although any suitable latching arrangement may be provided for controlling the position of the cross-bar 35 and the tripping member 28, I have shown for purposes of illustration a latching and releasing mechanism of the type described and claimed in a copending application of Joseph W. Seaman, Serial No. 78,179, filed May 6, 1936, entitled "Circuit breakers", which application is assigned to the same assignee as the present invention. The invention disclosed in the above Seaman application was made by the said Joseph W. Seaman prior to my invention, and I, therefore, do not herein claim anything shown or described in that application, which is to be regarded as prior art with respect to the present invention.

As disclosed in the said Seaman application, the cross-bar 35 is provided with a latching finger 36 which extends outwardly from the cross-bar and is provided with a roller 37 (Fig. 2) which engages a slot 38 formed in a pivoted latch member 39. Normally the roller 37 engages a shoulder in the slot 38 as shown best in Fig. 2 so as to hold the latch finger 36 in the position shown. It will be apparent, however, that when the latch member 39 is moved in a counterclockwise direction about its pivot so as to permit the roller 37 to move along the slot 38, the latch finger 36 carried by the cross-bar 35 will be released for movement and the tripping members 28 associated with each pole of the circuit breaker will be released for operation in a counterclockwise direction about their pivots by their associated tripping springs 29. Accordingly, the movable contacts 18 will be operated to their open-circuit position against the force exerted by the over-center springs 20 in the manner fully described in the above referred to Seaman application.

As best shown in Fig. 5 an expansible bellows 40 is mounted within the housing 15 of the center pole unit 12 with one end connected to a tube 41 and with the other end engaging a spring support 42 which is biased by a spring 43 to resist expansion of the bellows. The tube 41 is connected to a suitable temperature bulb 44 (Fig. 1) which is immersed in a body of insulating medium 45 such, for example, as oil contained within a transformer casing 46, the circuit breaker 10 being mounted as shown on one of the walls of the transformer casing.

It will be understood, of course, that the transformer includes a primary winding 47 and a secondary winding 48, shown diagrammatically in Fig. 3, which windings are immersed in the insulating medium 45, the secondary winding being connected to a suitable load in the manner shown in Fig. 3 by connecting the terminals 49 of the pole units 11 and 13 to the respective opposite ends of the secondary winding and by connecting the terminals 50 of the units 11 and 13 to a suitable load circuit 51. As shown best in Fig. 7 the circuit through each pole of the circuit breaker may be traced from the terminal 49 through the fixed contact 17, the movable contact 18, a flexible conductor 52 and a suitable thermal element 53 to the terminal 50. Each of the thermal elements 53 comprises a pair of bi-metallic strips 54 (Figs. 4 and 6), the free ends of which are electrically and mechanically connected together by a conducting member 55.

In order to provide for operation of the circuit breaker contacts to the open-circuit position when the temperature of the transformer windings reaches a dangerously high value, I provide a tripping mechanism for releasing the latch member 36 in response to a predetermined combined movement of the bellows 40 and one or both of the thermal elements 53. As best shown in Fig. 2 this tripping mechanism comprises a U-shaped frame secured to the base of the center pole unit 12, (Fig. 6) which frame includes a pair of spaced apart arms 56 arranged to support a rotatable trip shaft 57 normally biased to the position shown in the drawings by a spring 58. This trip shaft 57 is cut away as indicated by the reference numeral 59 to provide a latching portion arranged to be engaged by the free end of the latch member 39.

As best shown in Figs. 2 and 7 the latch member 39 is thus restrained by the trip shaft 57 against rotation in a counterclockwise direction. It will be apparent, however, that when the trip shaft 57 is rotated in a counterclockwise direction, as viewed in Fig. 5, the latch member 39 will be released for rotation about its pivot in a counterclockwise direction, the end of the latch member 39 passing through the cut-away portion 59 of the shaft 57 so as to permit the roller 37 to move toward the right-hand end of the slot 38 and thereby permit operation of the tripping members 28 so as to move the circuit breaker contacts to the open-circuit position.

Supported on the outermost ends of the arms 56 is an auxiliary shaft 60 which is normally biased to the position shown in the drawings by a spring 61 and which is provided intermediate the arms 56 with a bifurcated member 62, the arms of which extend outwardly from the shaft 60. Supported between the arms of the bifurcated member 62 is a pin 63 which pivotally supports one end of a movable lever 64. Adjacent its other end this lever 64 is provided with an elongated slot 65 through which extends an adjustable member or screw 66, one end of which abuttingly engages a lever 67 which is pivotally mounted on a pin 68 and biased to the position shown by a spring 69. As shown the screw 66 threadedly engages a slidable member 70 and a lock-nut 71 (Fig. 5), the purpose of which will be more fully described hereinafter.

It will be apparent that the lever 64 is mounted for pivotal movement about either of its ends. Thus, when the shaft 60 is rotated so as to move the pin 63, it will be seen that the lever 64 is moved about a pivot point which is determined by the abutting engagement of the screw 66 with the lever 67. Likewise when the lever 67 is moved about its pivot, it will be seen that the lever 64 will be pivoted about the pin 63 and, therefore, the portion of the lever 64 intermediate the pin 63 and the screw 66 will be given a movement which is the resultant of the combined movements of the two ends of the lever. As shown this intermediate portion of the lever 64 is arranged to engage an adjustable screw 72 which is carried by an arm 73 extending outwardly from the trip shaft 57. Therefore, a predetermined movement of the lever 64 is effective to rotate the shaft 57 so as to release the latch member 39.

In order to rotate the shaft 60 in accordance with the movement of either or both of the thermal elements 53 so as to move one end of the lever 64 in accordance with the movement of the thermal elements, the shaft 60 is provided with outwardly extending ends each of which carries a trip finger 74 provided with an adjustable screw 75, one end of each screw being arranged for abutting engagement with the free end of one of the thermal elements 53.

Likewise in order to move the lever 67 in accordance with the expansion of the bellows 40 so as to impart to the lever 64 a movement which corresponds to the movement of the bellows, I provide an operating rod 76 which extends through a key-hole shaped aperture 77 formed in the lever 67, one end of the operating rod 76 being secured to the movable end of the bellows 40. Adjustably secured to the rod 76 is a sleeve 78 which abuts against the lever 67 adjacent the aperture 77. It will be understood, of course, that the bellows 40, the tube 41 and the bulb 44 are filled with a suitable expansible medium so that the bellows will be affected by the temperature of the body of insulating medium 45, and it will be seen that when the bellows 40 expands the rod 76 will be movable longitudinally and the sleeve 78 will move the lever 67 in a clockwise direction about its pivot and thereby pivotally move the lever 64 about the pin 63.

It is now believed that a complete understanding of my invention may be had from the description of the operation. It will be assumed that the circuit breaker is in the position shown and that an overload condition occurs which causes an abnormal current to flow in the secondary winding of the transformer. Upon the occurrence of such an overload condition the abnormal current flowing through the thermal elements 53 will cause the thermal elements to flex and thereby rotate the shaft 60 so as to move the right end of the lever 64 downwardly as viewed in Fig. 5 and the consequent heating of the transformer oil will cause the bellows 40 to expand so that the sleeve 78 pushes against the lever 67 and moves the left-hand end of the lever 64 downwardly as viewed in Fig. 2. Upon a predetermined movement of the portion of the lever 64 intermediate the pin 63 and the screw 66, the trip shaft 57 will be rotated sufficiently, due to the abutting engagement of the screw 72 with the intermediate portion of the lever 64, to release the latch member 39 and thereby cause operation of the circuit breaker contacts to the open-circuit position.

It will be understood, of course, that the relation of the movement imparted by the thermal elements to the movement imparted by the expansible bellows will depend upon the character and magnitude of the overload current flowing. As is more fully pointed out in the above referred to Cooney application, it is highly desirable that the transformer shall be disconnected from its load circuit only when the temperature of the transformer windings reaches a dangerously high value. Accordingly it is desirable that the load-time characteristic of the circuit breaker shall approximate as closely as possible the load-time characteristic of the transformer.

It will be apparent now that the load-time characteristic of the circuit breaker may be adjusted by varying the position of the screws 75 relative to the trip arms 74, by varying the position of the screw 72 relative to the arm 73, and by varying the distance that the screw 66 projects from the lever 64. Further adjustment of the load-time characteristic is provided by the arrangement of the slidable member 70 relative to the slot 65 in the lever 64. Thus it will be seen that when the lock-nut 71 is loosened, the slidable member 70 may be adjusted to any desired position along the slot 65 and may be locked in the desired position by tightening up the lock-nut 71. Furthermore the initial position of the lever 67 about its pivot 68 may be predetermined by varying the position of an adjustable member 79, one end of which abuttingly engages the lever 67.

After an automatic tripping operation, the circuit breaker may be reset by operating the handle 33 in a clockwise direction about its pivot from the position shown in the drawing to engage and depress the cross-bar 35 so that the roller 37 carried by the latch finger 36 is moved along the slot 38 to return the latch member 39 to the position shown. If the trip shaft 57 has been returned to its normal position by the spring 58 the latch member 39 will be retained in this position and the circuit breaker contacts may then be reclosed by returning the handle 33 to the position shown in the drawing. It will be apparent, however, that until the thermal elements 53 have cooled sufficiently to return to their normal positions and until the body of transformer oil 35 has cooled sufficiently to permit the bellows to return to its normal position the lever 64 will prevent the return of the trip shaft 57 to its normal position and, accordingly, the circuit breaker cannot be reclosed.

Inasmuch as the relatively large body of transformer oil has a high heat storage capacity, it will be understood that a considerable time may elapse before the bellows will have contracted sufficiently to permit reclosure of the circuit breaker. Since it may often-times be desirable to reclose the circuit breaker regardless of the temperature of the transformer oil, I provide means for temporarily disconnecting the bellows from the trip mechanism. As best shown in Figs. 2 and 5 the enlarged portion of the key-hole shaped aperture 77 in the lever 67 is somewhat larger than the adjustable sleeve 78. Accordingly, the adjustable sleeve when in alignment therewith is free to pass through the slot. Normally, however, the sleeve 78 and the rod 76 are biased in a left-hand direction as viewed in Fig. 5 by a spring 80 so that the sleeve 78 is out of alignment with the aperture 77 and, accordingly, abuts against the lever 67 as shown. One end of this spring 80 engages the rod 76 as shown and the other end of the spring engages the upper end of the key-hole shaped slot 77 (Fig. 2).

In order temporarily to disengage the bellows 40 from the trip mechanism, it is necessary only to move the outer end of the rod 76 in a right-hand direction as viewed in Fig. 5 so as to bring the sleeve 78 into alignment with the aperture 77. Thereupon the sleeve 78 will pass through the aperture 77 and, accordingly, the bellows 40 will no longer be effective to prevent the return of the lever 64 to its normal position shown in the drawings. As soon as the transformer oil has cooled sufficiently, however, it will be apparent that the bellows 40 will contract so as to withdraw the sleeve 78 from the aperture 77 whereupon the spring 80 will move the sleeve 78 and the rod 76 to the position shown in the drawings in which position the sleeve 78 abuttingly engages the lever 67.

It will thus be seen that I have provided an improved protective device which is effective to disconnect the transformer from the load upon a predetermined movement of either or both of the bi-metallic elements 53 in response to the flow of abnormal current in the secondary winding, even though the bellows 40 is disconnected from the tripping mechanism. For example, if an overload occurs in the secondary winding during the interval that the bellows is disconnected from the lever 67, i. e. while the transformer oil is cooling after a resetting operation it will be apparent that even though the bellows is ineffective the auxiliary shaft 60 will be rotated by one or more of the thermal elements 53 to move the lever 64 about the pivot point determined by the screw 66 and the lever 67, and release the latch member 39 in the manner described above.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States, is:

1. A protective device for a transformer comprising a movable lever, means for supporting the ends of said lever for movement, means for moving one end of said lever in accordance with the value of the current flowing in the transformer pivotally to move said lever about its other end, means for moving said other end of said lever in accordance with the temperature of said transformer pivotally to move said lever about said one end, and means for controlling said transformer in response to the resultant movement of said lever.

2. A protective device for an oil-cooled transformer comprising a movable lever, means for supporting the ends of said lever for movement, means for moving one end of said lever in accordance with the value of the current flowing in the transformer pivotally to move said lever about its other end, means for moving said other end of said lever in accordance with the temperature of the transformer oil pivotally to move said lever about said one end, and means for controlling said transformer in response to the resultant movement of a portion of said lever intermediate said ends.

3. A protective device for an oil-cooled transformer having a secondary winding connected to supply a load, said device comprising a movable lever, means for supporting the ends of said lever for movement, means for moving one end of said lever in accordance with the value of the current flowing in said winding pivotally to move said lever about its other end, means for moving said other end of said lever in accordance with the temperature of the transformer oil pivotally to move said lever about said one end, and means responsive to a predetermined resultant movement of a portion of said lever intermediate said ends for disconnecting said load from said secondary winding.

4. A protective device for an oil-cooled transformer having a secondary winding connected to supply a load, said device comprising a thermal element responsive to the load current, a second thermal element responsive to the temperature of the transformer oil, a lever, means for supporting the ends of said lever for movement, means controlled by said first thermal element for pivotally moving one end of said lever about its other end, means controlled by said second thermal element for pivotally moving said other end of said lever about said one end, and means responsive to the resultant movement of said lever for disconnecting said load from said transformer.

5. A protective device for an oil-cooled transformer having a secondary winding connected to supply a load, said protective device comprising a bi-metallic element arranged to be heated in accordance with the load current, an expansible bellows responsive to the temperature of the transformer oil, a lever, means for supporting the ends of said lever for movement, means for pivotally moving one end of said lever about its other end in accordance with the flexure of said bi-metallic element, means for pivotally moving the other end of said lever about said one end in accordance with the expansion and contraction of said bellows, and means responsive to a predetermined resultant movement of a portion of said lever intermediate said ends for disconnecting said load from said transformer.

6. A trip device for a circuit breaker comprising a movable lever, means for supporting the ends of said lever for movement, current responsive means for pivotally moving one end of said lever about its other end, temperature responsive means for pivotally moving the other end of said lever about said one end, and means responsive to the resulting movement of a portion of said lever intermediate said ends for operating said circuit breaker.

7. A trip device for a circuit breaker provided with a plurality of independently movable thermal elements, said device comprising a lever mounted for pivotal movement about its opposite ends, means controlled by one of said thermal elements for pivotally moving said lever about one of its ends, means controlled by another of said thermal elements for pivotally moving said lever about the other of its ends, and tripping means for said circuit breaker responsive to a predetermined resultant movement of an intermediate portion of said lever.

8. A trip device for a circuit breaker provided with a plurality of thermal elements one of which comprises a current responsive element and the other of which comprises a temperature responsive expansible member, said device comprising a lever mounted for pivotal movement about either of its ends, means controlled by said current responsive element for pivotally moving said lever about one of said ends, means controlled by said expansible member for pivotally moving said lever about the other of said ends, and tripping means for said circuit breaker responsive to a predetermined resultant movement of an intermediate portion of said lever.

9. A trip device for a circuit breaker provided with a plurality of thermal elements, said device comprising a lever, means for pivotally supporting one end of said lever, means for abuttingly supporting the other end of said lever, means for moving said pivotally supporting means in accordance with the movement of one of said thermal elements pivotally to move said lever about said abuttingly supported end, means for moving said abuttingly supporting means in accordance with the movement of another of said thermal elements pivotally to move said lever about said pivotally supported end, and means responsive to a predetermined resultant movement of a portion of said lever intermediate said ends for operating said circuit breaker to an open circuit position.

10. A trip device for a multi-pole circuit breaker provided with current responsive thermal elements respectively associated with each pole and with a temperature responsive expansible member, said device comprising a rotatable shaft, means for rotating said shaft in response to movement of any one of said current responsive thermal elements, a lever mounted for pivotal movement about either of its ends, means for pivotally moving said lever about one of its ends in accordance with the rotation of said shaft, means for pivotally moving said lever about the other of its ends in accordance with the expansion and contraction of said expansible member, and means responsive to a predetermined resultant movement of said lever for operating said circuit breaker to an open circuit position.

11. A trip device for a multi-pole circuit breaker provided with current responsive thermal elements respectively associated with each pole and with a temperature responsive expansible member, said device comprising a rotatable shaft, means for rotating said shaft in response to movement of any one of said current responsive thermal elements, means extending from said shaft for arcuate movement when said shaft is rotated, a lever having one end pivotally mounted on said arcuately movable means, means for abuttingly supporting the other end of said lever whereby said lever is pivotally moved about said abutting support when said shaft is rotated, means for moving said abuttingly supporting means in accordance with the expansion and contraction of said expansible member pivotally to move said lever about said pivotally mounted end, and means responsive to a predetermined resultant movement of said lever, for operating said circuit breaker to an open circuit position.

12. A circuit breaker for protecting an oil-cooled transformer, said circuit breaker comprising contacts connected in circuit with a winding of said transformer, a thermal element responsive to the current in said winding, a second thermal element responsive to the temperature of the transformer oil, a lever mounted for pivotal movement about either of its ends, means controlled by said first thermal element for pivotally moving said lever about one of said ends, means controlled by said second thermal element for pivotally moving said lever about the other of said ends, and means responsive to a predetermined resultant movement of an intermediate portion of said lever for operating said contacts to an open circuit position.

13. A protective device for electrical translating apparatus comprising a thermal element movable in accordance with the current flowing in the apparatus, a second thermal element movable in accordance with the temperature of the apparatus, means for combining the individual movements of said thermal elements, means responsive to a predetermined total movement of said thermal elements for controlling said apparatus, means for resetting said controlling means, and means for disconnecting said second thermal element from said combining means to permit resetting of said controlling means independently of the temperature of said apparatus.

14. A protective device for electrical translating apparatus comprising a thermal element movable in accordance with the current flowing in the apparatus, a second thermal element movable in accordance with the temperature of the apparatus, means for combining the individual movements of said thermal elements, means responsive to a predetermined total movement of said thermal elements for controlling said apparatus, means for resetting said controlling means, means for disconnecting said second thermal element from said combining means to permit resetting of said controlling means independently of the temperature of said apparatus, and means for automatically reestablishing the connection between said second thermal element and said combining means when the temperature of said apparatus falls to a predetermined value.

15. A protective device for an oil-cooled transformer having a secondary winding connected to supply a load, said device comprising a thermal element responsive to the load current, a second thermal element responsive to the temperature of the transformer oil, a combining lever mounted for movement by said two thermal elements, means responsive to a predetermined movement of said combining lever for disconnecting said load from said transformer winding, means for resetting said disconnecting means, and means for disengaging said second thermal element from operative relation to said combining lever to permit resetting of said disconnecting means independently of the temperature of said transformer oil.

16. A protective device for an oil-cooled transformer having a secondary winding connected to supply a load, said device comprising a thermal element responsive to the load current, a second thermal element responsive to the temperature of the transformer oil, a combining lever mounted for movement by said two thermal elements, means responsive to a predetermined movement of said combining lever for disconnecting said load from said transformer winding, means for resetting said disconnecting means, means for disengaging said second thermal element from operative relation to said combining lever to permit resetting of said disconnecting means independently of the temperature of said transformer oil, and means for automatically reengaging said second thermal element in operative relation with said combining lever when said transformer oil has cooled to a predetermined temperature.

17. A circuit breaker for protecting an oil-cooled transformer, said circuit breaker comprising contacts connected in circuit with a winding of said transformer, a thermal element responsive to the current in said winding, an expansible member responsive to the temperature of the transformer oil, a lever mounted for pivotal movement about either of its ends, means controlled by said thermal element for pivotally moving said lever about one of said ends, connecting means for moving said one end of said lever in accordance with the expansion of said expansible member pivotally to move said lever about its other end, means responsive to a resultant movement of an intermediate portion of said lever for operating said contacts to an open circuit position, means for reclosing said contacts, means for disconnecting said connecting means to permit reclosure of said contacts while said expansible member is in its expanded condition, and means for automatically resetting said connecting means upon a predetermined contraction of said expansible member.

CHARLES H. HILL.